(12) United States Patent
Hermansson et al.

(10) Patent No.: US 7,614,319 B2
(45) Date of Patent: Nov. 10, 2009

(54) DEVICE FOR SYMMETRICAL GEAR SHIFT

(75) Inventors: Bengt Hermansson, Mullsjö (SE);
Frank Dankbaar, Jönköping (SE)

(73) Assignee: Kongsberg Automotive AB, Mullsjö (SE)

( * ) Notice: Subject to any disclaimer, the term of this patent is extended or adjusted under 35 U.S.C. 154(b) by 508 days.

(21) Appl. No.: 10/562,310

(22) PCT Filed: Mar. 24, 2004

(86) PCT No.: PCT/SE2004/000446

§ 371 (c)(1),
(2), (4) Date: May 1, 2006

(87) PCT Pub. No.: WO2005/001314

PCT Pub. Date: Jan. 6, 2005

(65) Prior Publication Data

US 2007/0193385 A1    Aug. 23, 2007

(30) Foreign Application Priority Data

Jun. 27, 2003   (SE)   .................................... 0301892

(51) Int. Cl.
*B60K 17/04* (2006.01)
*B60K 17/12* (2006.01)
*B60K 20/00* (2006.01)
*F16H 59/04* (2006.01)

(52) U.S. Cl. ................ 74/473.12; 74/473.33; 74/473.18

(58) Field of Classification Search ................ 74/473.1, 74/473.12, 473.33, 473.18
See application file for complete search history.

(56) References Cited

U.S. PATENT DOCUMENTS

| 4,519,266 | A | * | 5/1985 | Reinecke ................ 74/471 XY |
| 6,098,483 | A | * | 8/2000 | Syamoto et al. .......... 74/473.18 |
| 6,415,677 | B1 | * | 7/2002 | Skogward ................ 74/473.12 |
| 2002/0056334 | A1 | * | 5/2002 | Fujinuma .................. 74/473.1 |

FOREIGN PATENT DOCUMENTS

| EP | 0 895 003 A1 | 2/1999 |
| EP | 1 076 192 A2 | 2/2001 |
| EP | 1 138 984 A2 | 10/2001 |

* cited by examiner

*Primary Examiner*—Thomas R Hannon
*Assistant Examiner*—Justin Krause
(74) *Attorney, Agent, or Firm*—Merchant & Gould P.C.

(57) ABSTRACT

An arrangement for controlling gear positions in a car includes a console having a wall, and one or more sensors arranged in connection to the console wall. The arrangement additionally includes a gear lever and a code device constructed to interact with the one or more sensors. The code device is connected to the gear lever so that the code device moves upon motion of the gear lever. The code device is pivotably secured adjacent to the gear lever, and the arrangement can bias the code device in a direction toward the console wall. The arrangement can further include an arm by which the code device is pivotably secured in the gear lever.

11 Claims, 6 Drawing Sheets

DEVICE FOR SYMMETRICAL GEAR SHIFT

TECHNICAL FIELD

The present invention relates to an arrangement for controlling gear positions in a car. By means of the invention, the possibility is created of using the same components for gear levers in right-hand and left-hand drive cars.

PRIOR ART

Modern cars are often equipped with gearboxes which give the driver the option of either having the gearbox function as a traditional automatic gearbox or having the driver choose between changing up or changing down in forward travel.

The choice between these two positions (automatic gearbox or changing up/down) is often made by the driver guiding the gear lever in one of two possible paths, in which one path gives one option and the other path gives the other option. Usually, the two paths lie parallel with each other, and switching between gearshift type, and hence between the two paths, is effected by the driver guiding the gear lever in a short third path connecting the first two paths. The two "main paths" are generally orientated essentially in the direction of travel of the car, and "the connecting path" is essentially perpendicular to the direction of travel of the car.

Switching between automatic gearshift and changing-up/down is therefore effected by a motion of the gear lever in a direction essentially perpendicular to the direction of travel, which means that the switching is effected by the driver guiding the gear lever away from him or toward him.

Suppose that in a car having the steering wheel on the left-hand side, the driver guides the lever toward him, in other words to the left, to switch to the position for changing up/down and, consequently, to the right to switch to the automatic position. It will be appreciated that the direction of movement "toward the driver" is to the left in a left-hand drive car and to the right in a right-hand drive car. There may be a desire for the driver, regardless of the side of the car in which the steering wheel is seated, to be able to switch to the position for changing-up/down by guiding the lever toward him, and conversely for switching to the automatic gear position.

In many gear systems, electronics are used to detect the position of the gear lever, either for transmitting information on the detected position to the gearbox and/or for sending the information to other systems in the vehicle, for example to be able to present the set gear position to the driver on the instrument panel. Where the "toward the driver" motion, for example, has to be able to be interpreted as switching to the position for changing-up/down regardless of the type of car (right-hand or left-hand drive) in which the system is seated, a set of components has hitherto been required for each type of car. There is naturally a desire to be able, instead, to use the same component or set of components regardless of car type.

ACCOUNT OF THE INVENTION

There is therefore a requirement to be able, as far as possible, to use the same components for controlling a gearbox in a car, regardless of whether the car is right-hand drive or left-hand drive.

This requirement is met by the present invention in that the invention sets out an arrangement for controlling gear positions in a car, which arrangement comprises a console, having a wall, and a sensor arranged in connection to this wall. The arrangement further comprises a gear lever and a code device which can interact with the said sensor, in which the code device is connected to the gear lever so that the code device is actuated to move upon motion of the gear lever.

The code device is pivotably secured adjacent to the gear lever and the arrangement further comprises means for biasing the code device in the direction of the said console wall.

Expediently, the arrangement further comprises an arm by which the code device is pivotably secured in the gear lever.

Owing to the configuration of the arrangement, the code device can always be disposed in the direction of the console wall, regardless of whether the car in which the arrangement is to be used is right-hand or left-hand drive. This means that the same console with the same sensor can always be used regardless of car type, the code device merely being fixed at different points in the gear lever in a manner which will become clearer from the following description.

The invention also relates to an arrangement essentially according to the above, but simply comprising gear lever and code device.

DESCRIPTION OF THE FIGURES

The invention will be described in greater detail below with the aid of the appended figures, in which.

EMBODIMENTS

Figure 1A:
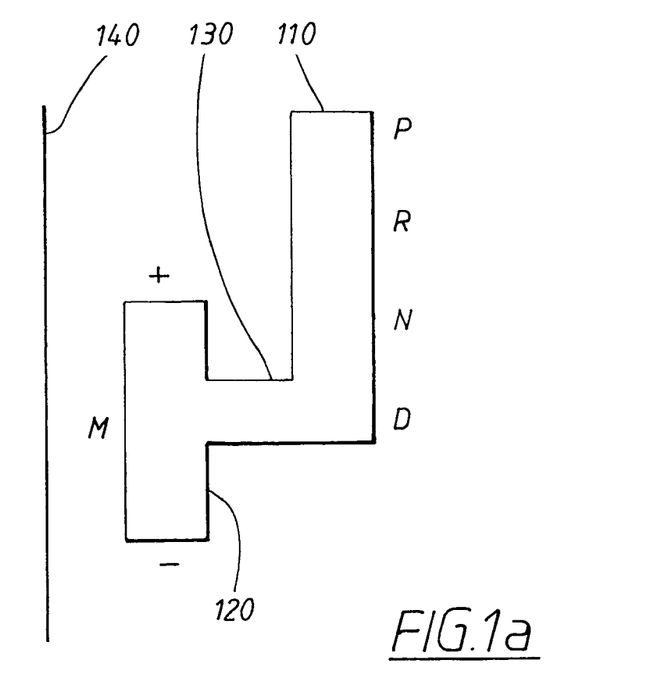
FIGS. 1a and 1b show top views of paths for a gear lever.
Figure 1B:
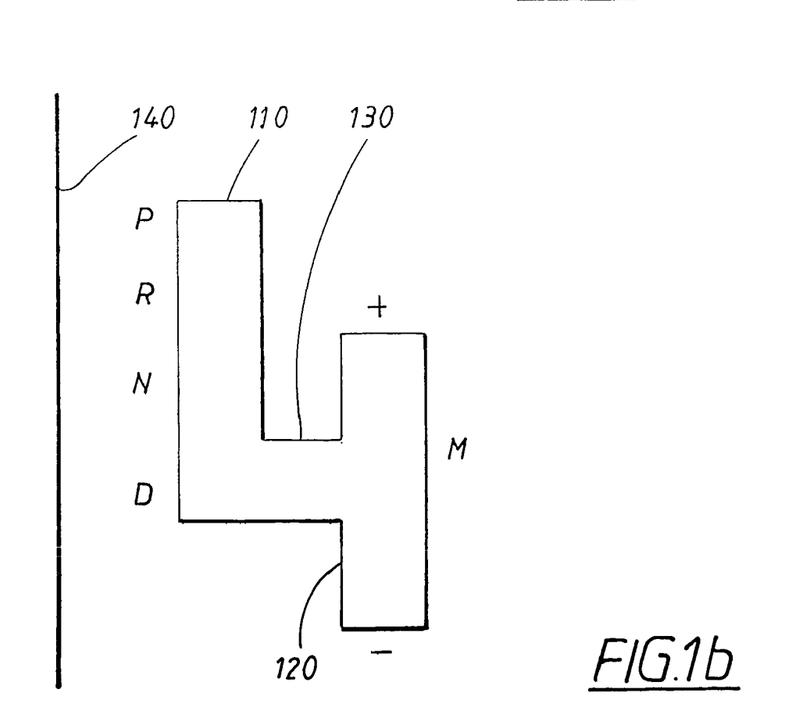

FIGS. 1a and 1b show diagrammatic top views of paths 110, 120, 130 for a gear lever. From FIG. 1a can be seen the various gear positions between which the driver can choose: in a first path 110 there are a number of positions, P R N D, for the driver to choose between by guiding the lever back and forth in the path. The driver can also choose a second path 120 for the motions of the lever, in which motion of the lever to one end position of the path 120 signifies changing-up and motion of the lever to the other end position of the path signifies changing-down.

As can further be seen from FIG. 1a, the driver switches between these two options (the first and the second path) by guiding the lever in a short connecting path 130 between the first 110 and the second 120 path.

The gear lever and arrangement with paths 110, 120, 130 is generally disposed in a console in the car, shown diagrammatically, at the extreme in FIG. 1a, by one wall 140 of the console being indicated with a straight line beside one path.

Suppose now that the gear arrangement in FIG. 1a is seated in a left-hand drive car. In this case, the driver switches to the +/− position by guiding the gear lever toward him. If the driver in a right-hand drive car is to be able to switch to the +/− position by guiding the gear lever toward him, then the paths arrangement must appear, by contrast, as in FIG. 1b.

In many new cars, electronics will be able to be used to detect which gear position the driver has chosen, either for being able to forward the information to the gearbox or for sending the information to other systems in the vehicle, for example a display system on the instrument panel.

Detection of change between gear positions and of the newly set gear position is effected in this case by a sensor detecting the positions and motions of the gear lever and converting these into electric signals which are sent to the vehicle system(s) in need of the information. Usually, some type of sensor is in this case seated in or adjacent to the console, which sensor registers the positions and motions of the gear lever and sends these to the gearbox.

One object of the invention is that one and the same set of components will be able to be used in a gear arrangement having electronic detection of the "commands" of the driver, regardless of whether the arrangement in question is seated in left-hand drive or right-hand drive cars. Nor will the arrangement according to the invention be dependent on whether the switchover to the +/− position is toward the driver, as shown in FIGS. 1a and 1b, or whether it is away from the driver.

As already stated, a gear arrangement of the type for which the invention is intended makes use of a sensor in or adjacent to the console, which sensor detects the position and motions of the gear lever. Generally there is some type of sensor seated in the console wall, which detects a detection element, for example a magnet, which is made to move together with the gear lever.

The present invention will be portrayed below on the basis of the magnet/magnetic sensor principle, but it should be pointed out that many other types of sensors and detection elements are conceivable within the scope of the invention.

When the gear lever is guided back and forth in the two paths 110, 120, a sensor will register that the gear lever is performing a motion in which certain specific positions correspond to the various gear positions.

Figure 2:
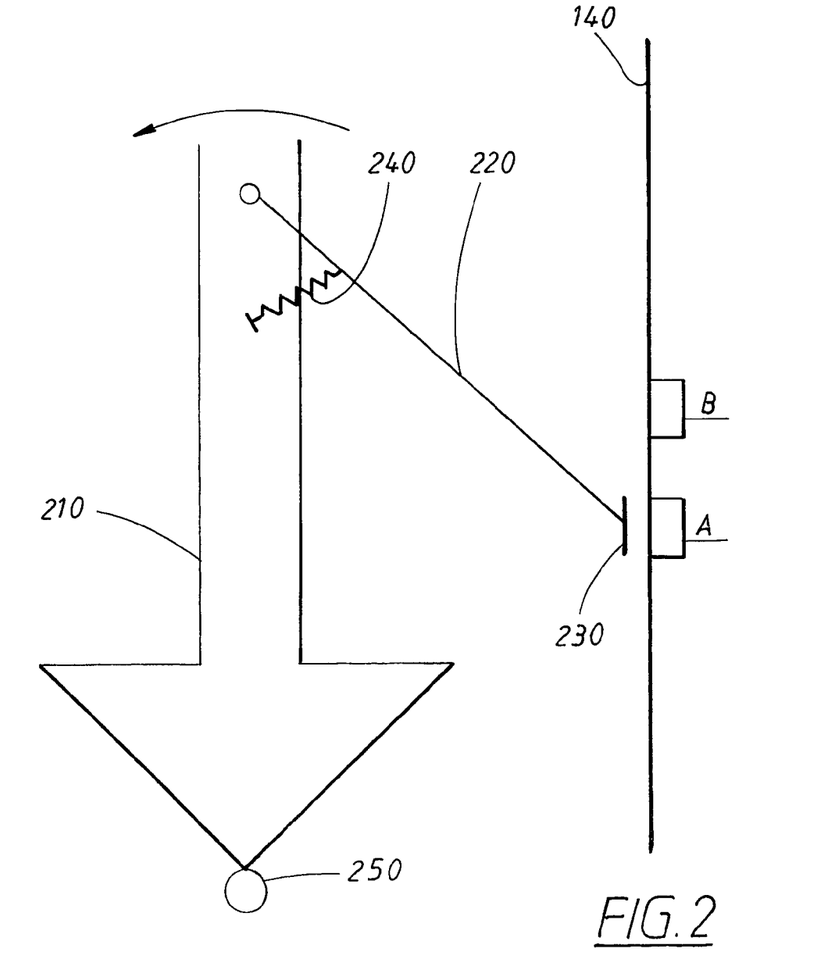
FIG. 2 shows a pattern of movement for a gear lever between different gear positions.

A part of the invention is shown diagrammatically in FIG. 2; a console having a wall 140 has sensors arranged in connection to the wall, expediently in two separate paths A and B, in which each path contains within it a sub-sensor for each lever position which is to be detectable, for example P R N D and + and −, respectively.

The console is disposed alongside a gear lever 210, and the gear lever 210 has a code device 220, 230, 240 which can interact with the sensors in the sensor paths A, B in the console wall 140. The code device is connected to the gear lever 210 so that the code device is actuated to move upon motion of the gear lever and is pivotably secured in the gear lever. The arrangement further comprises means 240 for biasing the code device in the direction of the said console wall 140.

Expediently, but not necessarily, the code device is pivotably secured in the gear lever 210 by an arm 220. The code device can comprise within it a detection element 230, which is fixed at one end of the arm 220, and the detection element 230 moves with the code device, which can be detected by the sensors in the sensor paths A, B in the console wall 140.

The gear lever 210 moves—on the basis of the manoeuvres of the driver—about a pivot point 250 at the foot of the lever, about which the lever is secured, and can therefore move in the directions allowed by the paths 110, 120, 130 in FIGS. 1a and 1b, in other words forward/backward and sideways. Upon forward/back motion of the lever ("into" and "out of" the paper), the arm 220, and hence also the detection element 230 at the far end of the arm will describe a circular motion over the sensor paths A, B in the console wall 140. A biasing device 240, expediently a spring, will constantly ensure that the detection element bears against the console wall, in other words that the detection element is loaded away from the gear lever.

Suppose that the position of the gear lever 210 which is shown in FIG. 2 corresponds to a location of the gear lever in the path 110 (P R N D) in FIG. 1. When, in this case, the lever is moved by the driver "into" and "out of" the paper, the detection element 230 will describe the circular motion shown in FIG. 3: the element is located throughout before a sensor path A, in the console wall, with different positions corresponding to P, R, N, D.

When the driver wishes to switch to the +/− position, he guides the lever in the direction of the arrow in FIG. 2, in other words to the left (toward himself in a left-hand drive car). The biasing means, the spring 240, will press the arm 220 against the console wall 140, and this, in combination with the hinged suspension of the arm from the gear lever 210, will mean that the detection element is quite simply "lifted up" along the console wall, still in contact with the wall owing to the spring.

In this position, the detection element will be directly in front of another part of the sensor, the sensor path B, which is seated in the console wall. The motion of the gear lever in the path 120 in FIG. 1 ("into" and "out of" the paper in FIG. 2) will correspond to a motion of the detection element 230 over the console wall 140 in a second circular arc, corresponding to the sensor path B, which is shown in FIG. 3.

Figure 4:
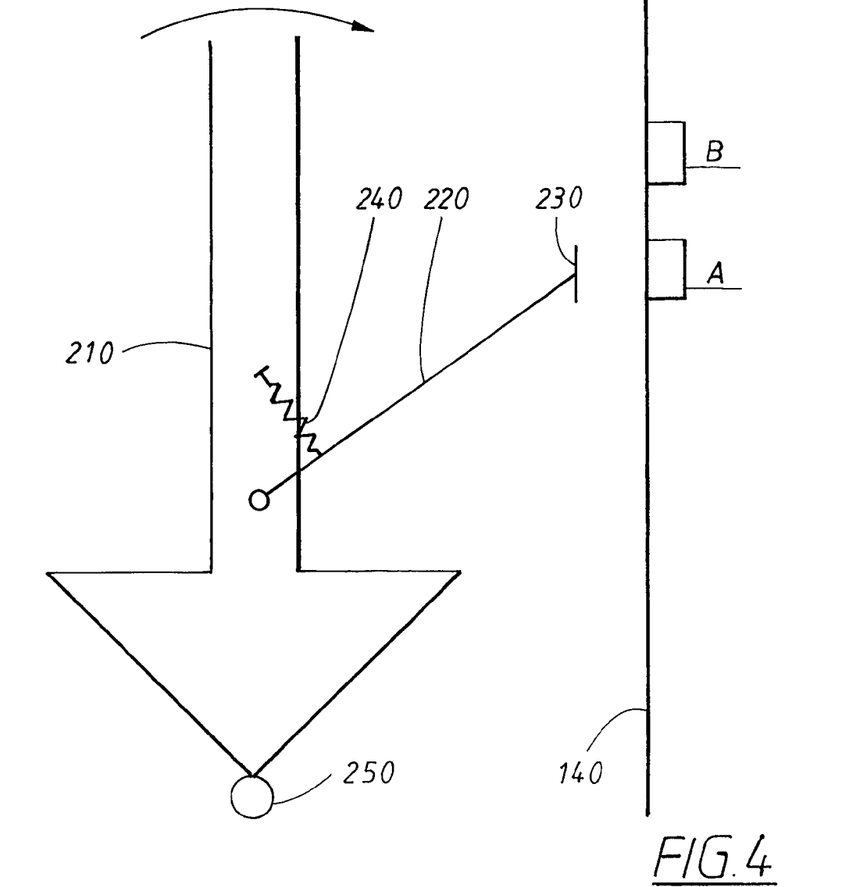

FIG. 4 shows an arrangement according to the invention, arranged for a car having the steering wheel on the opposite side compared with the arrangement in FIG. 2. As can be seen from FIG. 4, exactly the same parts can be used, as is described below.

The arm 220 is fixed at a different point in the gear lever 210 compared with the arrangement in FIG. 2 and is directed at another angle compared with the angle in FIG. 2; in FIG. 2 the arm is directed downward relative to the gear lever, whilst in FIG. 4 it is directed upward relative to the gear lever, for reasons which will become clear when the motions of the gear lever are described below.

Figure 3:
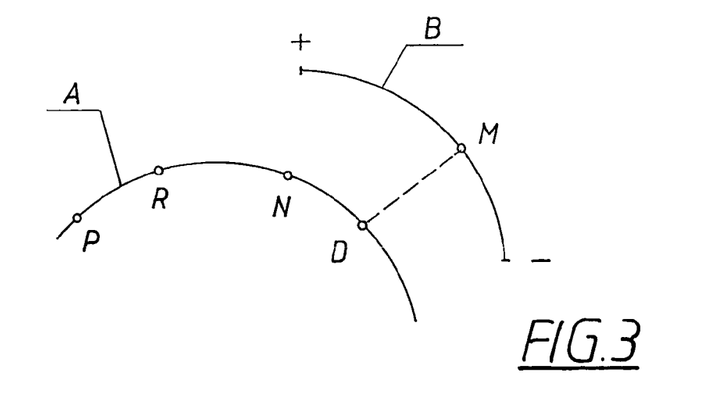
FIGS. 3 and 4 are diagrams showing the principle behind the invention.

In order for one and the same sensor device A, B, to be usable in both cases (left-hand and right-hand drive) and to be able to be positioned at the same place in the console, the detection element 230 must move over the two paths A and B shown in FIG. 3. This is one of the reasons why the arm is not disposed at the same point in the gear lever, nor at the same angle relative to the gear lever in the two cases.

When the gear lever 210 in FIG. 4 is guided toward the driver, in other words to the +/− path 120, this is a motion to the right on the paper. The arm 220, and hence the detection element 230, is lifted upward, and passes from path A to path B in the console wall 140, which is exactly the same motion as the detection element made upon motion of the lever in the other direction (left) in the embodiment in FIG. 2.

The biasing means, the spring 240, remains in place and continues to load the arm 220, and hence the detection element 230, in the direction of the console wall 140. Since the motion of the gear lever back and forth in the respective paths (+/− and P, R, N, D) is identical in the embodiments in FIGS. 2 and 4, the motion will not here be described in further detail. Reference is made quite simply to FIG. 3 and the description of the embodiment in FIG. 2.

The invention as hitherto portrayed functions well, but in order further to improve the functioning of the invention, another feature may be provided: when the arm 220 moves up and down over the console wall 140, the detection element 230 will have different angles in relation to the console wall. This might lead to reduced signal strength in the detection, which can create problems.

Figure 5:
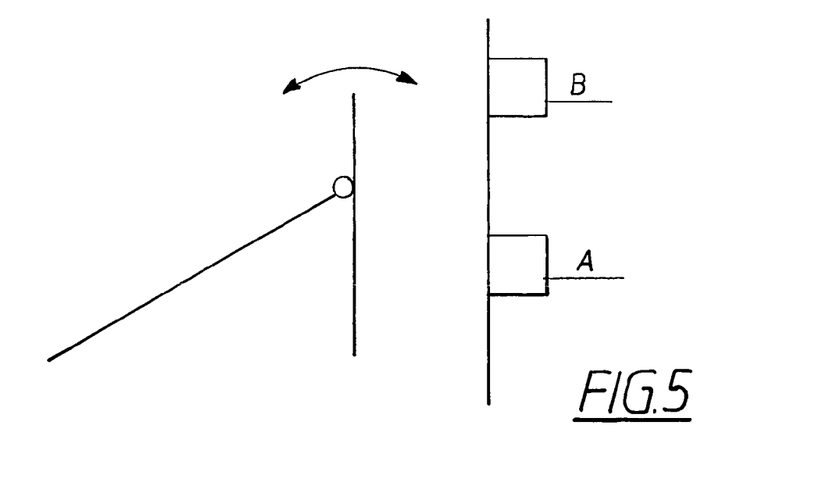
FIG. 5 shows a possible complement to the invention.

In FIG. 5, a facility according to the invention is shown, for ensuring that the angle between the detection element 230 and the wall 140 is always the same: the detection element 230 is pivotably secured in the arm 220 in such a manner that the articulation allows the detection element always to be able to maintain essentially the same angle in relation to the wall, regardless of the motions of the gear lever. Another way of expressing this is that the element is pivotably fastened in the arm in such a manner that the articulation allows a motion of the detection element in the same plane as the motion of the arm between the two gear paths, +/− and P R N D, respectively.

Figure 6:
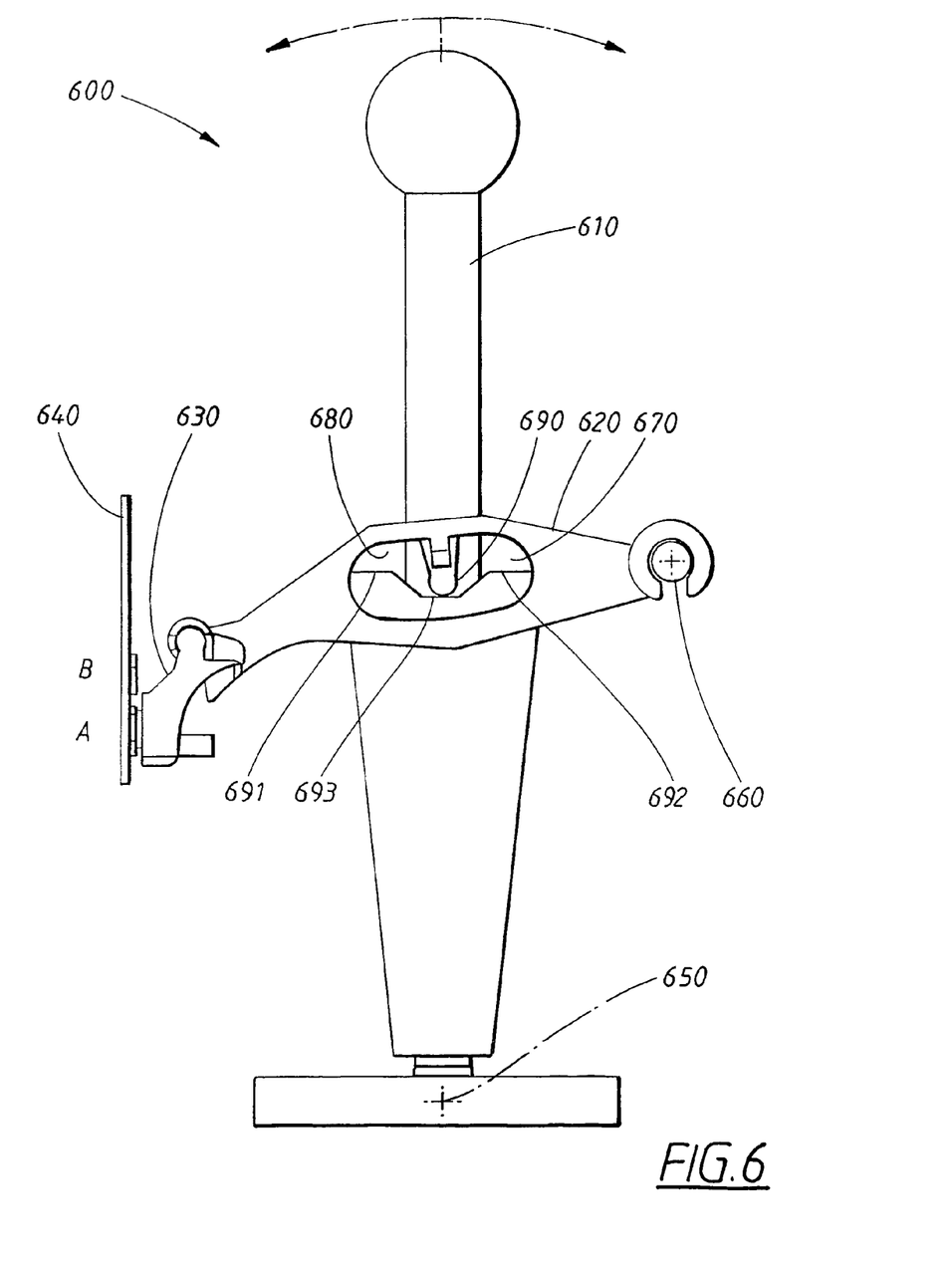
FIGS. 6-8 show an alternative embodiment of the invention.

FIG. 6 shows an alternative embodiment 600 of the invention. An object of this embodiment, too, is that, in principle, the same components will be usable, regardless of whether the gear lever arrangement is to be used in a right-hand drive or left-hand drive car.

As is shown in FIG. 6, the embodiment 600 also comprises a gear lever 610 and a code device 630. The gear lever 610 can move in a first and a second principal direction, which are essentially perpendicular to each other. One principal direction is left-right in the plane of the paper and the other is "in-out" in the plane of the paper.

The motions of the gear lever are the same as those described in connection with FIGS. 1 and 2, in other words the left-right motion is the switchover between fully automatic gearshift and +/− gearshift. The code device 630 is connected to the gear lever in such a manner that it moves in a first direction (vertical in FIG. 6) upon left-right motion of the gear lever, and in a second direction (arched horizontal in FIG. 6), perpendicular to the first, upon "in-out" motion of the gear lever in the plane of the paper. All motions of the code device are made over a console wall 640, in which sensors A, B are disposed in paths in the manner described in the first embodiment and shown in FIGS. 2 and 3. Since the device 600 will be usable regardless of whether the vehicle is right-hand or left-hand drive, the device comprises control means for ensuring that the motion of the code device in its first direction of movement is one and the same, regardless of the direction in which the gear lever is guided in its first principal direction, in other words right-left in the plane of the paper. This motion is realized about a pivot point 650.

The control means are shown in FIG. 6 and comprise an arm 620 in which the code device 630 is pivotably secured. The arm 620 is, in turn, pivotably secured about an axis 660, which, in the device 600, is seated in a casing around the gear lever. The arm 620 and the gear lever 610 together comprise a so-called cam mechanism; the arm has a spike or cam follower 690 disposed against a cam, in other words in this case a component part comprising two ridges 691, 692, between which there is a recess 693. The cam does not sit fixedly in the arm 620, but is arranged such that it is jointly moved with the motions of the gear lever in the left-right direction.

Figure 7:
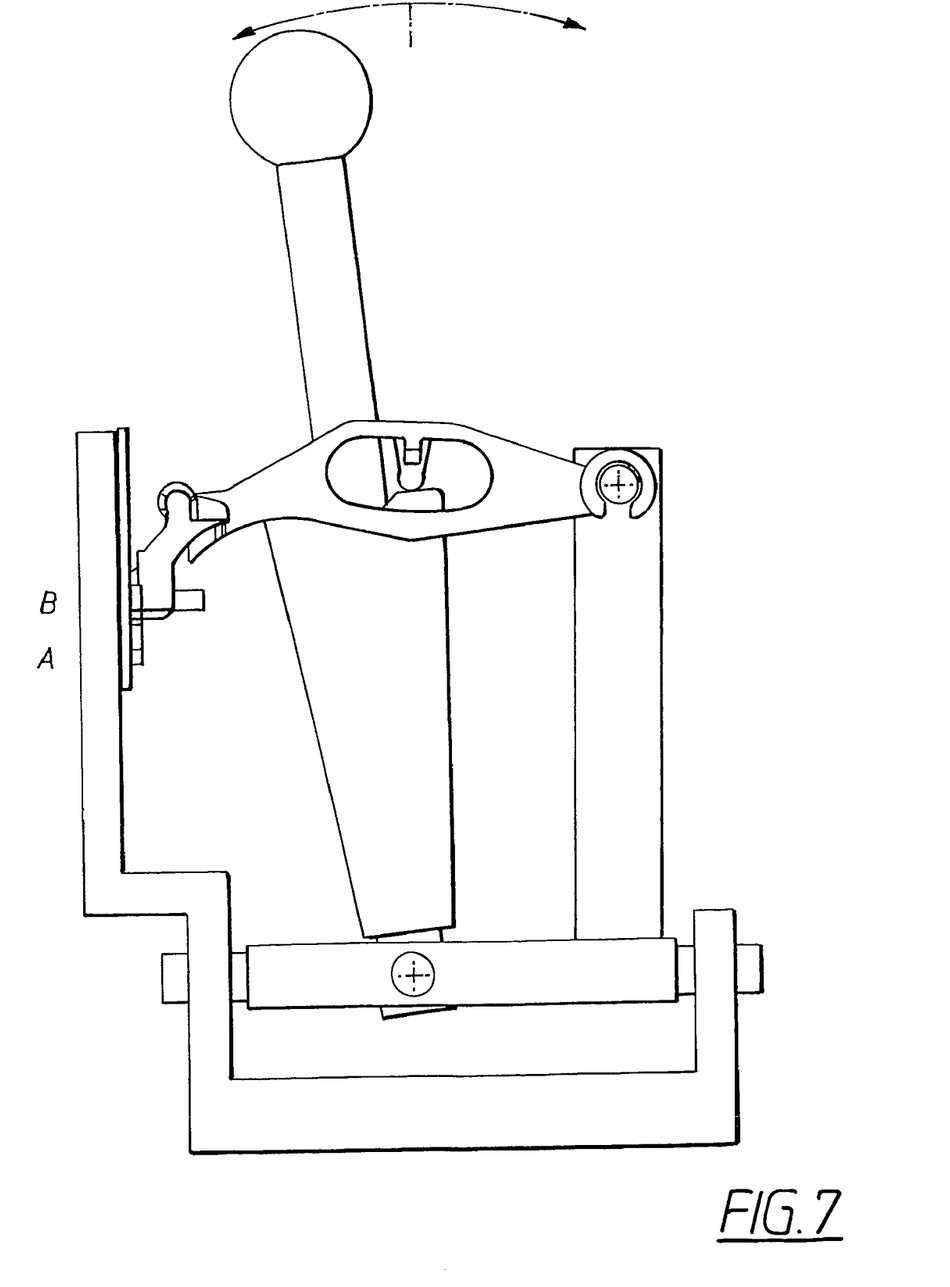

In FIG. 6, the device 600 is shown with the gear lever 610 in a position in which the cam follower 690 is located in the recess 693 in the cam. FIG. 7 shows the same device, but in a position in which the gear lever 610 has been guided to the left. The leftward motion of the gear lever has actuated the arm 620 to rotate about the axis 660. Upon the rotation of the arm 620 about the axis 660, the code device 630 will be guided upward over the wall 640 by means of the cam mechanism; the cam follower 690 is guided up onto the first ridge 692, whereupon the arm 620, and hence also the code device 630, is guided upward. Upon motions of the gear lever in the "in-out" direction out of the paper, the code device 630 will now follow the detector path B instead of the detector path A.

The two positions shown in FIGS. 6 and 7, respectively, correspond to the gear lever being guided between the fully automatic gearshift (P, R, N, D) position and the +/− gear position. As is shown, this switchover is effected by the gear lever being guided to the left (FIG. 7) from a middle position (FIG. 6).

Figure 8:
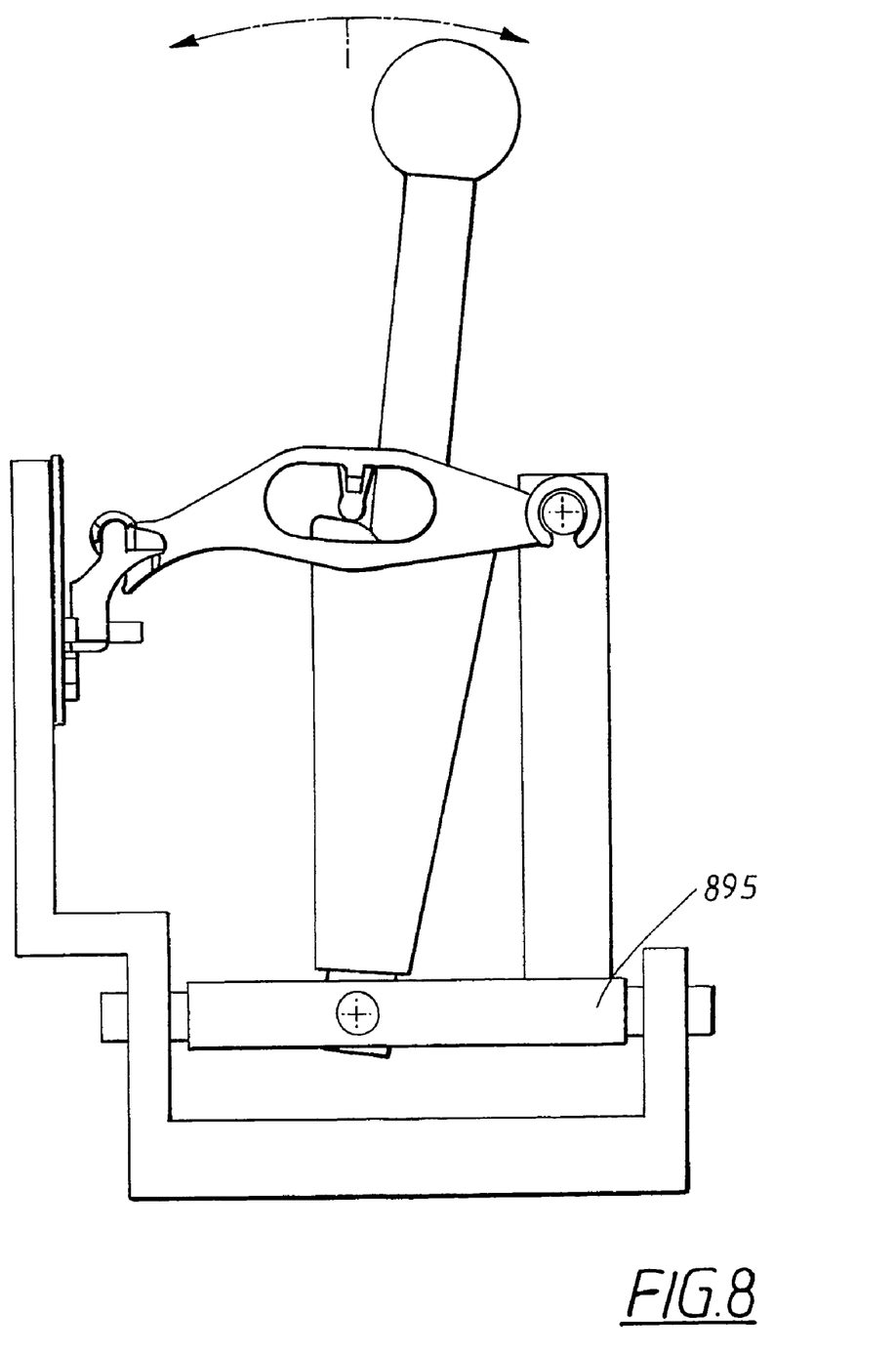

Suppose now that the device 600 is to be fitted in a car in which the said switchover, fully automatic to +/−, is effected by the gear lever instead being guided to the right from a middle position. This is shown in FIG. 8, in which the gear lever 610 has been guided to the right from the middle position shown in FIG. 6. Upon this motion, too, of the gear lever 610, the code device 630 will be moved upward over the wall 640 by means of the cam mechanism: when the gear lever moves to the right, the arm 620 rotates about the axis 660, whereupon the cam follower 690 is forced up onto the second ridge 691 and the code device 630 is guided up over the wall 640.

In order to ensure that the code device 630 always bears against the wall 640, which produces good signal strength in respect of the detection, the device 600 also comprises a means (not shown) for biasing the code device toward the wall 640, in other words away from the gear lever 610. This biasing means can be realized in a variety of ways, but, in a preferred embodiment, is a spring seated on the arm 620.

In FIGS. 7 and 8, another detail of the device 600 according to the invention is shown; as stated, the motion of the gear lever 610 in the left-right direction is effected about a centre of rotation 650, which, in turn, sits fastened in a pivot mechanism 895 which allows motion in the "in-out" direction out of the plane of the paper.

Since the code device 630 according to the invention will move in the same manner regardless of whether the lever is guided to the right or left from a middle position, the arrangement 600 will therefore be usable regardless of whether it is lever motion to the right or left which is to effect a shift from path A to path B. The only modification required is to fit different types of outer casing on the arrangement, in which the casing quite simply blocks the motion which is not relevant. Such blocking can expediently be realized by providing the casing with grooves corresponding to the motions which can be made by the gear lever.

The invention claimed is:

1. An arrangement for controlling gear positions in a car, comprising:
   a console having a wall, and one or more sensors arranged in connection to said wall;
   a gear lever constructed to move back and forth in a first and second principal direction essentially perpendicular to each other;
   a code device constructed to interact with said one or more sensors, wherein the code device is connected to the gear lever so that the code device moves in a first direction of movement upon motion of the gear lever in said first principal direction, and in a second direction of movement upon motion of the gear lever in said second principal direction, wherein the code device is pivotably secured adjacent to the gear lever;
   means for biasing the code device in a direction toward said console wall; and
   means for making the motion of the code device in the first direction of movement identical regardless of whether the gear lever is guided forward or backward in its first principal direction, when the gear lever is provided in a first position or a second position in its second principal direction of movement, the means comprising an arm, wherein the code device is pivotably secured, and in which the arm, in turn, is pivotably secured about an axis, wherein the arm, by means of a mechanism involving a cam and a cam follower, is actuated to follow a cam curve upon motion of the gear lever in the first principal direction.

2. The arrangement according to claim 1 wherein each sensor comprises a plurality of sub-sensors disposed in a path.

3. The arrangement according to claim 1, wherein the cam follower is disposed on the arm and the cam adjoins the gear lever.

4. The arrangement according to claim 1, wherein the code device comprises a detection element, which is fixed at one end of the arm, the motion of the detection element upon motion of the code device being able to be detected by the said sensors.

5. The arrangement according to claim 4, wherein the detection element is pivotably secured at the said one end of the arm.

6. The arrangement according to claim 5, wherein the pivot fastening of the detection element is articulated, and in which the device comprises means for biasing the code device toward the wall.

7. An arrangement for controlling a gearbox in a car, comprising:
- a gear lever constructed to move back and forth in a first and second principal direction essentially perpendicular to each other;
- a code device constructed to interact with one or more sensors, wherein the code device is secured in the arrangement so that the code device moves in a first direction of movement upon motion of the gear lever in the said first principal direction, and in a second direction of movement upon motion of the gear lever in the said second principal direction, wherein the code device is pivotably secured adjacent to the gear lever;
- means for biasing the code device in a direction away from the gear lever; and
- means for making the motion of the code device in the first direction of movement identical regardless of whether the gear lever is guided forward or backward in its first principal direction, when the gear lever is provided in a first position or a second position in its second principal direction of movement, the means comprising an arm, wherein the code device is pivotably secured, and in which the arm, in turn, is pivotably secured about an axis, wherein the arm, by means of a mechanism involving a cam and a cam follower, is actuated to follow a cam curve upon motion of the gear lever in the first principal direction.

8. The arrangement according to claim 7, wherein each sensor comprises a plurality of sub-sensors disposed in paths.

9. The arrangement according to claim 7, wherein the cam follower is disposed on the arm, and the cam adjoins the gear lever.

10. The arrangement according to claim 7, wherein the code device comprises a detection element fixed at one end of the arm, the motion of the detection element upon motion of the code device being detectable by the said sensors.

11. The arrangement according to claim 10, wherein the detection element is pivotably secured at the said one end of the arm.

* * * * *